Sept. 14, 1965        G. E. SWICK, JR        3,205,911

FLUID COUPLING WITH IMPROVED SEALING MEANS

Filed Aug. 11, 1961        2 Sheets-Sheet 1

INVENTOR
GEORGE E. SWICK JR.

BY *Jerry K. Harness*

ATTORNEY

Sept. 14, 1965   G. E. SWICK, JR   3,205,911
FLUID COUPLING WITH IMPROVED SEALING MEANS
Filed Aug. 11, 1961   2 Sheets-Sheet 2

INVENTOR
GEORGE E. SWICK JR.

BY *Jerry K Harness*

ATTORNEY

United States Patent Office 3,205,911
Patented Sept. 14, 1965

3,205,911
FLUID COUPLING WITH IMPROVED
SEALING MEANS
George E. Swick, Jr., Springfield, Ill., assignor to
Aeroquip Corporation, Jackson, Mich., a corporation of Michigan
Filed Aug. 11, 1961, Ser. No. 132,260
1 Claim. (Cl. 137—614.03)

The present invention relates to couplings for fluid conduits and has particular reference to a coupling used for refrigeration purposes.

The main object of the present invention is to provide a new type coupling designed to meet the leakproof requirements for refrigerant lines used in refrigeration and air conditioning. It has been devised to permit safe storage as well as simplified field installation of factory charged components on all forms of refrigeration systems.

More particularly the invention relates to a self sealing coupling using only one mechanical joint comprising a metal sealing ring between the coupling halves. The sealing ring is of a triangular cross sectional configuration providing opposed knife edges for accommodating sealing action and an outer apex edge to allow a press fit of the ring in the coupling. The ring is nestled within an annular recess in one of the coupling halves. A portion of the wall structure forming the annular recess also forms a seal for one valve head and engages the sliding valve to unseal the other valve head.

Other objects and advantages will become more apparent from the following description taken in conjunction with the accompanying drawings in which.

Figure 3:
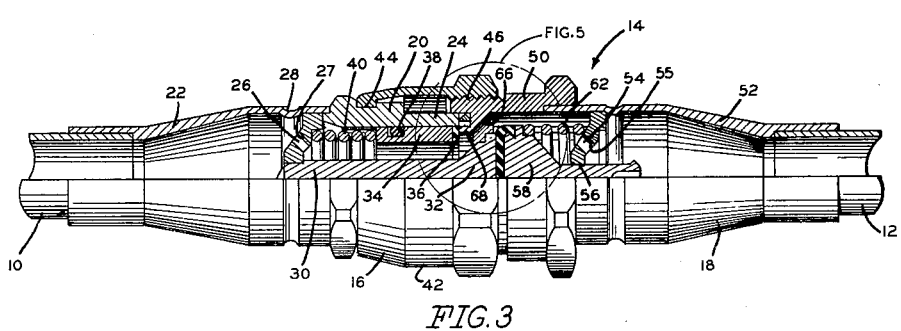
FIG. 3 is an elevational view similar to FIGS. 1 and 2 showing the coupling in its completed coupled position.

Referring now to the drawings there is shown metal conduits 10 and 12 which are connected by a self sealing coupling generally referred to by the numeral 14. The self sealing coupling 14 comprises coupling halves 16 and 18 which when assembled as shown in FIG. 3 allow the passage of fluid therethrough.

The type of coupling illustrated is self sealing and is particularly adaptable for refrigeration systems although it should be kept in mind that the invention disclosed herein may be used with various types of couplings in various types of fluid systems.

The coupling half 16 comprises a main body portion 20 which at one end is brazed to an extension 22 while the other end thereof provides an annular shoulder 24. The extension 22 at its other end is brazed to the conduit 10. Positioned within the coupling half 16 at substantial the juncture of the body portion 20 and the extension 22 is an annular base member 26 which is ported as at 27. The member 26 is positioned between the end of the base portion 20 and an annular depression 28 formed in the extension 22.

Figure 1:
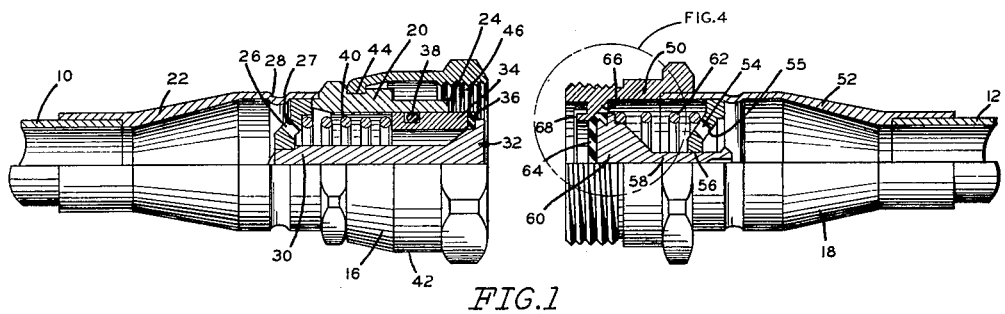
FIG. 1 is a side elevational view, partly in section illustrating the coupling in its uncoupled condition.
Figure 2:
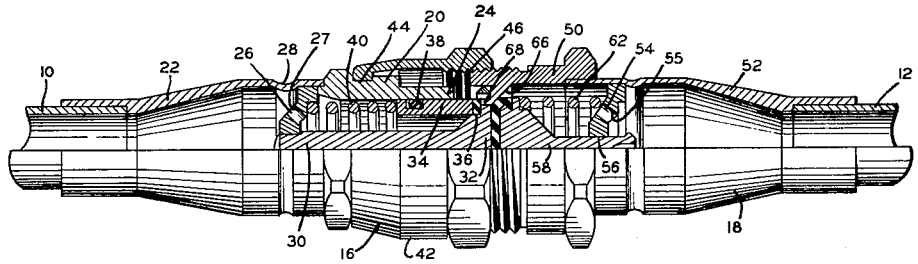
FIG. 2 is an elevational view similar to FIG. 1 showing the coupling in a partially coupled position.

Disposed concentrically within the base portion 20 and fixed to the base member 26 is a valve stem 30 having an integral valve head 32. A cylindrical valve sleeve 34 is slideably mounted within the body portion 20 and has its forward end engaging the valve head 32 in a sealing manner. An annular gasket 36 is fixed to the end of the sleeve 34 to effect the seal between the sleeve and the valve head. The sleeve 34 is provided with an annular recess which receives an O ring 38 to effect a seal between the outer surface of the sleeve 34 and the inner cylindrical surface of the body portion 20. The valve sleeve 34 is urged into its sealing position against the valve head 32, as shown in FIGS. 1 and 2, by a coil spring 40 which is positioned between the rear end of the sleeve 34 and the member 26. The coupling half 16 is also provided with a socket 42 which has its one end rotatably carried within an annular recess 44 formed on the exterior surface of the body portion 20. The other end of the socket 42 is provided with internal threads 46 to effect connection of the coupling halves as hereinafter described.

Coupling half 18 comprises a body portion 50 having one end brazed to an extension 52 the latter being brazed to the conduit 12. The coupling half 18 is also provided with a base member 54 ported as at 55 which is press fit in the forward end of the extension 52 and which is provided with a central opening 56 to slideably receive a valve stem 58. The stem 58 is integrally connected to a valve head 60. The head 60 is urged leftwardly when viewing the drawings by a spring 62 which is positioned between the head 60 and the member 54. The valve head 60 is provided with a cap 64 formed of yieldable rubber-like material which covers the forwardly extending face of the valve head 60 and extends around the annular end of the valve head.

To effect a seal and thereby prevent escapement of the fluid within the coupling half 18 when the halves are separated, the base portion 50 is provided with an annular inwardly extending projection 65 having a frusto conical shoulder 66. The projection 65 terminates in an axially extending abutment 68. As viewed in FIGS. 1 and 2, the outer annular edge of the valve head 60 engages the frusto conical shoulder 66 through the cap 64 to thereby effect a seal. The outer surface of the body portion 50 is threaded at 70 to facilitate securement of the coupling halves as hereinafter described.

Figure 4:
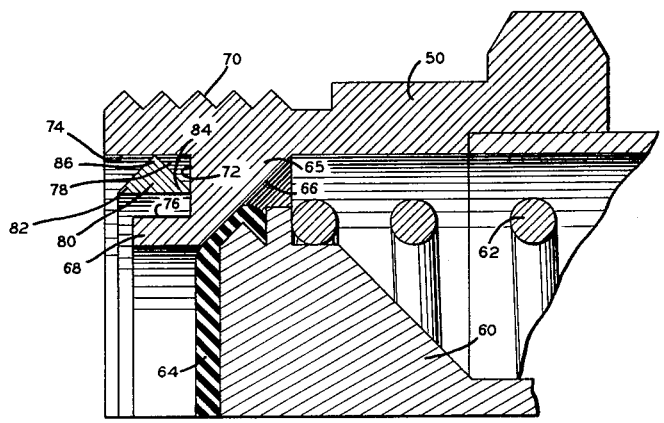
FIG. 4 is an enlarged sectional view of that portion shown within the circle 4 of FIG. 1.

Referring now to FIG. 4, it will be seen that the annular inwardly extending projection 65 is provided on one side with the frusto conical shoulder 66 and on its other side with an annular shoulder 72, the latter being substantially perpendicular to the longitudinal axis of the coupling. The inner cylindrical end surface 74 of the body portion 50 along with the shoulder 72 and the outer cylindrical surface 76 of the abutment 68 form an annular pocket 78.

As more closely seen in FIG. 4 the annular pocket 78 is provided with a sealing ring 80 having a triangular cross sectional configuration. The ring 80 is provided with axially spaced knife edges 82 and 84 and with an outer edge 86. The configuration of the sealing ring 80 facilitates a novel aspect of this invention by allowing the ring to be pre-assembled with the coupling half. The outer diameter of the ring 80 is predetermined in dimension relative to the inner cylindrical end surface 74 of the body portion 50 so that the ring 80 may be press fit into the pocket 78. By this construction the ring 80 may be installed in the coupling half 18 during the manufacturing process and shipped to the user without any necessity for supplying the sealing ring separately. The unique configuration of the projection 65 and the abutment 68 allows the placement of the sealing ring, in its press fit condition, so that it will not be subject to inadvertent dislodgment or damage during shipment. Once the ring 80 is installed, as shown in FIG. 4, it remains there for the life of the coupling and the coupling halves may be connected and disconnected at will without fear of loss of the sealing ring.

Figure 5:
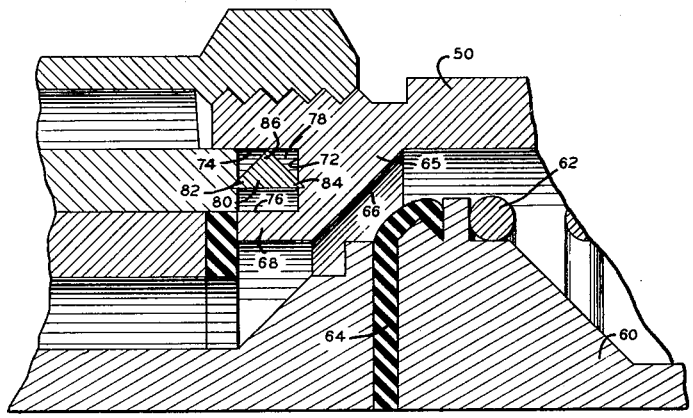
FIG. 5 is an enlarged sectional view of that portion shown within the circle 5 of FIG. 3.

FIG. 5 illustrates the manner of sealing when the coupling halves are secured together. In progressively viewing the drawings it will be seen that the coupling halves are joined as the socket 42 is rotated while the threads 46 thereof engage the threads 70 formed on the body portion 50 of the coupling half 18. As this socket is rotated to bring the coupling halves closer together the valve head 32 engages the valve head 60 and moves it rightwardly as viewed in the drawings against the action of the spring 62 thereby unseating the valve head 60 from the frusto conical shoulder 66. Simultaneously, the abutment 68 engages the annular gasket 36 to thereby slideably shift the sleeve 34 leftwardly as viewed in the drawings against the action of the spring 40. This action of the valve parts of the coupling provides a fluid path through the assembled coupling. As the socket 42 is finally tightened to its position as shown in FIGS. 3 and 5 the annular knife edges 82 and 84 are squeezed between the annular shoulder 24 on the body portion 20 and the annular shoulder 72 on the inwardly extending projection 65 effecting a seal to prevent leakage when the coupling is completely assembled.

It will be noted in FIG. 5 that the knife edges 82 and 84 of the sealing ring 80 bite into the shoulders 24 and 72. This biting action is facilitated by the fact that the sealing ring 80 is made of a metallic material of greater hardness than the shoulders that it engages. Although various metals may be used to carry out the teachings of this invention it has been found by experiment that a relatively soft metal such as annealed brass can be used for the body portions of the coupling halves while the sealing ring may be made of a metal such as stainless steel.

It should be pointed out that the radially inwardly extending projection 65 and its integral abutment 68 perform a triple function. When the coupling halves are separated, the frusto-conical seat 66 on the projection 65 serves as a valve seat for the valve head 60. When the coupling halves are connected the abutment 68 on the projection 65 unseats the valve sleeve 34 to thereby allow fluid flow through the coupling half 16. During all conditions of the coupling halves 16 and 18, whether joined or apart, the projection 65 and its abutment 68 along with the inner cylindrical surface 74 of the body portion 50 form the annular pocket 78. This pocket receives and protects the sealing ring 80. As more clearly seen in FIG. 1, the ring 80 is substantially enclosed on three sides when the coupling halves are separated. The chances of damage to the sealing member during shipment and handling are, therefore, remote. The sealing means for the coupling halves is out of the way and need not concern the handler of the coupling since the ring is press fit into position.

While I have shown and described but one embodiment of the invention, certain changes may be made without departing from the spirit of the invention or the scope of the claim appended hereto.

I claim:

A coupling adapted to join adjacent conduits comprising first and second mating coupling halves having facing ends provided with substantially parallel annular shoulders, one of said halves between its facing end and its annular shoulder being provided with an entrant portion having an inwardly facing cylindrical surface; an annular metal seal of generally triangular cross-sectional configuration disposed within said entrant portion and having an outer annular edge engaging said cylindrical surface, opposed annular edges sealingly engaged between said annular shoulders, and a radially inwardly facing surface; said one half being of such configuration that space exists between said radially inwardly facing surface and said one half in a radially inwardly direction; and means interconnecting said halves; the resiliency and the outer diameter of said seal being predetermined to provide frictional engagement of said outer edge of said seal with said cylindrical surface whereby said seal may be press fit within said cylindrical surface.

References Cited by the Examiner

UNITED STATES PATENTS

| | | | |
|---|---|---|---|
| 1,132,086 | 3/15 | Goodall | 285—336 |
| 1,272,267 | 7/18 | Horton | 285—336 X |
| 1,709,807 | 4/29 | Purnis | 251—365 |
| 1,834,581 | 12/31 | Ferrell et al. | 277—236 |
| 2,471,880 | 5/49 | MacDonald | 251—365 |
| 2,514,976 | 7/50 | Stivin | 285—336 X |
| 2,604,507 | 7/52 | Tyson | 277—236 X |
| 2,706,487 | 4/55 | Wilson | 251—362 X |

FOREIGN PATENTS 555,692  9/43  Great Britain.

LAVERNE D. GEIGER, *Primary Examiner.*

WALTER A. SCHEEL, *Examiner.*